United States Patent Office 3,150,062
Patented Sept. 22, 1964

1

2

3,150,062
METHOD OF MANUFACTURING BIOLOGICAL INSECTICIDE AND PRODUCT THEREOF

Richard A. Greenberg, Chicago, and Harland H. Young, Western Springs, Ill., assignors to Swift & Company, Chicago, Ill., a corporation of Illinois No Drawing. Filed Oct. 31, 1960, Ser. No. 65,921
7 Claims. (Cl. 195—96)

This invention relates to a method for the production of pesticidal compositions and to a method for combating insect pests, particularly of the leaf-chewing type, with said pesticidal compositions.

The invention is concerned with microbial insect pathogens, particularly those containing viable, spore-forming bacteria of the strain *Bacillus thuringiensis* Berliner and an improved method for preparing pesticidal materials containing these bacteria. It has been recognized in the past that viable spores of *Bacillus thuringiensis* Berliner might be employed in combating leaf-chewing insects such as the alfalfa caterpillar, the cosmopolitan grain beetle, the European corn borer, the Mediterranean flour moth, etc., and although such compositions have been considered effective to a degree against the aforementioned insects, no widespread use of such an insecticide has been made. Thus, vegetables such as lettuce, alfalfa, spinach, potatoes, celery, and other growing crops such as apples and cotton have been treated with other insecticides, although they could be protected by insecticides containing *Bacillus thuringiensis* spores as an essential ingredient.

One of the reasons for the lack of widespread use of insecticides containing such spores has been because of the cost of the material. The insecticidal activity of such compositions has previously been considered to be related to the spore count. The requirement that compositions have very high spore counts renders the cost of the material excessive.

It is, therefore, an object of this invention to provide an improved method for the production of highly potent insecticidal compositions containing *Bacillus thuringiensis* Berliner spores which compositions are economical to manufacture.

A further object of the invention is to provide a spore-containing pesticide which is lethal to specific insects even though the total viable spore count is low in comparison with the generally accepted minimum requirement.

Still another object is the provision of an improved method for combating leaf-chewing insects with an insect pathogen which is substantially nontoxic to warm-blooded animals, fish, reptiles, plants and useful insects.

Additional objects, if not specifically set forth herein, will be readily apparent to those skilled in the art from the detailed description of the invention which follows.

In general, the present invention comprises a method for the preparation of insecticides containing viable *Bacillus thuringiensis* Berliner spores and sporulation products, said insecticides having an insecticidal activity comparable to *Bacillus thuringiensis* Berliner compositions having viable spore counts several times greater than the subject material. Also, the method assures the production of an effective *Bacillus thuringiensis* Berliner composition at a substantially lower cost than has been possible heretofore. The product containing spores and sporulation products produced during the proliferation of the spores exhibits an insecticidal activity surprisingly potent in view of the comparatively low spore count of the product. The combined viable spore and sporulation products are obtained from the culture medium in which the spores are grown. The active insecticidal ingredients and toxic precursors can be deposited upon an inert solid carrier to facilitate the distribution thereof.

In the preparation of *Bacillus thuringiensis* Berliner spore concentrates which have in the past been employed in controlling insects, it has been the practice to concentrate the spores as much as possible. One method for concentrating the spores involves filtering spore suspensions of *Bacillus thuringiensis* Berliner through a diatomaceous earth filter and drying the diatomaceous earth-spore mixture. The resulting product would have any desired spore concentration, depending on the character and amount of material passed through the filter. The liquid medium which passes through the filter during the filtration operation appears to be discarded or utilized in some non-pesticidal product. The expense involved in such methods for obtaining high spore count insecticides is substantially greater than the cost per unit of insecticidally active material produced in accordance with the present method.

One procedure for producing the compositions of this invention involves the proliferation of spores of the strain *Bacillus thuringiensis* Berliner in a culture medium; depositing the spores produced and the sporulation products on an inert carrier and drying the carrier having the spores and sporulation products thereon. All of the components of the culture medium are ingredients of the final product although the amount of water is substantially reduced. In this embodiment of the invention an inoculum of *Bacillus thuringiensis* Berliner spores is introduced into a culture medium where the spores are incubated. Vegetative cells could also be employed to initiate growth and sporulation. The culture medium may be any suitable broth containing elements essential for growth such as soluble carbohydrates, a source of available nitrogen, and the necessary minerals.

After incubating the resultant culture under suitable conditions, an inert solid particulate vehicle may be added and admixed therewith. The medium containing the spores and sporulation by-products including insect toxins is subjected to conditions which effect removal of water and the dried residue remaining comprises the improved insecticidal composition. While the mixture possesses around 1.5 billion spores per gram this is a substantially lower viable spore count than the spore counts of known effective biological insecticides of this type. Also, since the method for producing the composition does not require filtration of the medium and other operations required in concentrating the spores, substantial economies are realized. Thus, even where larger amounts of the insecticide disclosed herein are required to obtain the same activity as high spore count prior art compositions, the substantial disparity of the cost of the two materials renders the instant compositions clearly superior.

The inert finely divided carrier which is employed in one embodiment of the invention may be of any of the well-known insecticide carriers. The composition may be prepared as an impalpable powder and applied to vegetation either as a dust or made into a suspension and used as a spray. When used as a dust, the insecticide is adsorbed on or admixed with a suitable diluent such as clay, talc, bentonite, etc. Similarly, the insecticide may be deposited on an adsorbent desiccant such as soybean hulls, peanut shells, sawddust, etc. When applied as a spray, using water as a carrier, it may be desirable to incorporate a wetting agent such as soap powder, sodium alkyl aryl sulfonate, or other powdered detergents, etc. The effectiveness of the insecticide is not diminished by the presence of any of the conventional anionic, nonionic, and cationic emulsifiers.

The amount of active insecticide which is adsorbed on the carrier may be varied over a wide range. Since it is a simple procedure to distribute the ferment on the carrier and then remove the water from the mixture, the amount of carrier employed can be very small or quite substantial. Concentrated dusts prepared from 10 parts ferment to 1 part carrier have been found very satisfactory while dilute dusts containing 1 part ferment and 1 part carrier have also been found effective.

Removal of water from the mixture of the ferment and the adjuvant may be effected by any of the known drying procedures such as simple evaporation, tray-drying, drum-drying, etc. to produce an insecticide having little or no moisture. It is also possible, where desired, to use the mixture as a slurry without drying or to dry to a given moisture content.

One method for preparing the insecticidal composition is set out in Example I which follows.

Example I

The medium formulation is comprised of the following. Volume increase can be made by increasing each ingredient in proper proportion and adjusting to meet operating conditions:

A.

| | |
|---|---|
| Cerelose | gm 5 |
| Corn steep liquor | gm 4 |
| Ammonium sulfate | gm 4 |
| Sodium hydroxide | gm 0.2 |
| Water | ml 900 |

B.

| | |
|---|---|
| $K_2HPO_4$ | gm 1 |
| $MnSO_4 \cdot H_2O$ | mg 150 |
| $MgSO_4 \cdot 7H_2O$ | gm 1 |
| $ZnSO_4$ | mg 1 |
| $CuSO_4$ | mg 1 |
| $CaCl_2$ | mg 1 |
| $FeSO_4$ | mg 1 |
| Water | ml 100 |

Each of the components A and B is autoclaved at 15 lbs. for 15 minutes and the two components are aseptically combined. The medium is inoculated with a seed culture of *Bacillus thuringiensis* Berliner prepared in a similar medium or other suitable way of initiating germination and growth. The fermentation is allowed to proceed for 40–48 hours at 85–95° F. with aeration and agitation. At the end of this time 200 parts of the fermentation liquor, including the spores, vegetative cells, and the liquid, is mixed with 100 parts of pulverized soybean hulls. The mixture is dried by evaporation and the dried product is milled to reduce lumps and bagged for sale.

Example II

A ferment was prepared in accordance with the method set forth in Example I. The fluid after proliferation of the spores was divided into several portions for formulation. In each case, formulation involves drying the ferment to form a thick fluid, combining the ferment with a carrier to the approximate consistency of paste and further drying to form a dry concentrate which can be ground as, for example, in a hammer mill to form powder. The following formulations having the ratio of ferment to carrier noted and dried under different conditions were prepared:

| Formulation | Amount of liquid ferment, ml. | Amount of carrier, gm. | Carrier material | Drying conditions |
|---|---|---|---|---|
| 1 | 200 | 100 | Bentonite | Air-dried, 100° F. |
| 2 | 200 | 100 | ----do---- | 210–214° F., 5½ hr. |
| 3 | 400 | 100 | ----do---- | Air-dried, 100° F. |
| 4 | 400 | 100 | Diatomaceous earth. | Do. |

Insecticidal activity was determined by bioassay with the salt marsh caterpillar. Caterpillars of from 2–5 days old are a very satisfactory test animal. The following table shows the comparative effectiveness of the compositions of this invention compared to a control containing no *Bacillus thuringiensis* Berliner spores and two commercially available samples containing substantial quantities of *Bacillus thuringiensis* Berliner spores. The tests was carried out by dipping bean shoots in water suspensions of the test preparations (0.025% by weight) and using them as sole source of food for salt marsh caterpillars confined 4 days at constant temperature (80° F.) and relative humidity (35–40%).

| Formulation | Live caterpillars | Dead caterpillars | Percent mortality |
|---|---|---|---|
| Control (water) | 46 | 4 | 8 |
| Test 1 contains 0.9 billion spores/gm | 22 | 28 | 56 |
| Test 2 contains 0.45 billion spores/gm | 26 | 24 | 48 |
| Test 3 contains 1.3 billion spores/gm | 33 | 17 | 34 |
| Test 4 contains 1.3 billion spores/gm | 27 | 23 | 46 |
| Commercial sample containing 8 billion spores per gram | 33 | 17 | 34 |
| Commercial sample containing 5 billion spores per gram | 28 | 22 | 44 |

The formulation employing diatomaceous earth as the carrier (Sample No. 4 prepared above) was employed in a field test with a control sample containing no *Bacillus thuringiensis* Berliner spores and the commercial sample containing 5 billion spores per gram and a non-spore-containing chemical insecticide currently employed for the protection of growing cabbages. Six rows of cabbages were treated with each of the formulations and the growing cabbages were examined 5 weeks after application of these formulations. The insecticides were applied to the cabbages at a concentration of 3 lbs. per acre. Those cabbages which had little or no damage to the leaves were considered satisfactory while those which were not considered of sufficient quality to permit their sales to the housewife as fresh cabbage were considered bad. The following table shows the degree of protection provided by each formulation:

| Formulation | Good cabbages | Bad cabbages |
|---|---|---|
| Control | 9 | 69 |
| Test 4 (1.3 billion spores/gm.) | 42 | 36 |
| Phosdrin* | 41 | 37 |
| Commercial insecticide containing 5 billion spores per gram | 47 | 31 |

*Phosdrin—2 carbomethoxy-1-methylvinyl dimethyl phosphate.

It is, of course, possible to produce an insecticide composition of any desired concentration and consistency. The type of drying employed is not critical and conventional drying means such as spray-drying, drum-drying, oven-drying, vacuum evaporators, etc. can be employed to obtain any desired concentration of the fermentation liquor, depending upon the concentration of active ingredient desired. The fermentation liquid can be concentrated by evaporation and employed at almost any concentration desired.

Obviously many modifications and variations of the invention as hereinbefore set forth may be made without departing from the spirit and scope thereof and, therefore, only such limitations should be imposed upon the invention as are indicated in the appended claims.

We claim:

1. A process for preparing a biological insect pathogenic composition containing as an essential ingredient thereof viable spores of the microorganism *Bacillus thuringiensis* Berliner comprising: proliferating *Bacillus thuringiensis* Berliner organisms in a nutrient medium containing water to produce *Bacillus thuringiensis* Berliner spores and other products of growth in said medium, depositing said nutrient medium containing said spores and the entire residue of the fermentation on a wettable powder to form a mixture thereof, and removing water from said mixture.

2. A process for preparing a microbial pesticide having as an essential ingredient thereof viable spores of the microorganism *Bacillus thuringiensis* Berliner comprising: proliferating *Bacillus thuringiensis* Berliner spores by culture fermentation in a nutrient medium containing water, contacting said medium containing said spores and the entire fermentation media with a particulate adjuvant, dispersing said adjuvant in said medium to form a mixture thereof and removing water from said mixture whereby to provide a substantially dry particulate mixture of said adjuvant and said spores and the entire residue of the fermentation.

3. A method for producing a biological insecticide particularly adapted for use in combating chewing insects comprising: dispersing in a growth fermentation menstruum containing *Bacillus thuringiensis* Berliner spores and the entire residue of the fermentation a finely divided adsorbent carrier, admixing said adsorbent carrier with said menstruum, and drying the mixture so formed whereby to produce a dried concentrate thereof.

4. The method of claim 1 wherein the water is removed by heating said medium at elevated temperatures.

5. The method of claim 2 wherein the adjuvant is a wettable clay.

6. The method of claim 2 wherein the ratio of liquid to adjuvant is about 10:1 to 1:1.

7. The product prepared in accordance with the method of claim 1.

References Cited in the file of this patent

Steinhaus et al.: "Further Observations on *Bacillus thuringiensis* Berliner and Other Sporeforming Bacteria." A Journal of Agricultural Science, published by the California Agricultural Experiment Station, vol. 23, No. 1, May 1954 (copy in Division 63).

Chemical and Engineering News, 36:51, Dec. 22, 1958, page 15, 167/65.02 (copy in Pat. Off Sci. Library).

Fleschner: Science, vol. 129, Number 3348, Feb. 27, 1959, pages 537–544 (copy in Pat. Off. Sci. Lib.).

Kushner et al.: J. Gen. Microbiology 21, 1959, page 96 (copy in Div. 43, 167/65.02).